(12) United States Patent
Ruiz

(10) Patent No.: US 8,279,556 B2
(45) Date of Patent: Oct. 2, 2012

(54) SLIDER AIR BEARING FOR DISK DRIVES

(75) Inventor: Oscar Ruiz, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 682 days.

(21) Appl. No.: 12/477,755

(22) Filed: Jun. 3, 2009

(65) Prior Publication Data
US 2010/0309586 A1 Dec. 9, 2010

(51) Int. Cl.
*G11B 5/60* (2006.01)

(52) U.S. Cl. ............... 360/234; 360/235; 360/236

(58) Field of Classification Search ........... 360/234–236
See application file for complete search history.

(56) References Cited

U.S. PATENT DOCUMENTS

| | | | |
|---|---|---|---|
| 5,587,858 | A | 12/1996 | Dorius et al. |
| 6,069,769 | A | 5/2000 | Dorius et al. |
| 6,333,835 | B1 | 12/2001 | Kang et al. |
| 6,674,611 | B2 | 1/2004 | Bolasna et al. |
| 6,771,468 | B1 | 8/2004 | Levi et al. |
| 6,999,284 | B2 | 2/2006 | Tadepalli et al. |
| 7,184,244 | B1 | 2/2007 | Haddock et al. |
| 7,218,478 | B2 | 5/2007 | Mate et al. |
| 7,324,306 | B2 | 1/2008 | Ruiz |
| 7,339,766 | B2 | 3/2008 | Yao et al. |
| 7,359,155 | B2 | 4/2008 | Hanyu |
| 2002/0071216 | A1* | 6/2002 | Sannino et al. ............ 360/236.1 |
| 2003/0090833 | A1 | 5/2003 | Tani et al. |
| 2004/0012887 | A1* | 1/2004 | Rajakumar et al. ........ 360/236.2 |
| 2005/0213253 | A1* | 9/2005 | Takahashi et al. ......... 360/236.3 |
| 2005/0280943 | A1* | 12/2005 | Inoue et al. ................ 360/236.2 |
| 2006/0238922 | A1* | 10/2006 | Hanyu ........................ 360/235.8 |
| 2007/0159724 | A1 | 7/2007 | Dorius et al. |
| 2008/0024924 | A1 | 1/2008 | Bolasna et al. |

FOREIGN PATENT DOCUMENTS

JP 2001-052324 2/2001

OTHER PUBLICATIONS

Liu, et al., "Femto Slider: Fabrication and Evaluation [Magnetic Disk Storage]", *Magnetic Recording Conference*, (2002),CA6-01-CA6-02.
Gonzaga, et al., "Altitude-Insesitive Femto Slider Design", *Asia-Pacific Magnetic Recording Conference*, (Nov. 29, 2006),1-3.
Best, et al., "Boosting HDD Evolution With the Femto Slider", http://www.eetasia.com/ARTICLES/2003SEP/B/2003SEP01_MEM_CT_TA.PDF?SOURCE=DOWNLOAD, (2003),1-2.
Xu, et al., "Flying Height Modulation and Femto Slider Design", *IEEE Transactions on Magnetics*, vol. 39, Issue 5, (Sep. 2003),2438-2440.

* cited by examiner

*Primary Examiner* — Jami M Valentine

(57) ABSTRACT

A slider designed to reduce fly height sigma in a plurality of fly media is provided. The slider includes an air bearing surface, a front shallow step pad and a rear shallow step pad that are at a first level deeper than the air bearing surface. The slider further includes a first rear side pocket that is at a second level deeper than the air bearing surface, the first side pocket substantially polygon shaped and a second rear non-symmetrical side pocket non-symmetrical with the first rear side pocket that is at the second level deeper than the air bearing surface, the second side pockets substantially polygon shaped wherein the second rear non-symmetrical side pocket comprises a larger volume than the first rear side pocket.

17 Claims, 11 Drawing Sheets

1000

```
┌─────────────────────────────────────────────────────────┐
│     providing an air bearing surface on a disk drive slider    │
│                          1010                            │
└─────────────────────────────────────────────────────────┘
                              │
                              ▼
┌─────────────────────────────────────────────────────────┐
│  forming a front shallow step pad and forming a rear shallow step │
│   pad that are at a first level deeper than the air bearing surface │
│                          1020                            │
└─────────────────────────────────────────────────────────┘
                              │
                              ▼
┌─────────────────────────────────────────────────────────┐
│  forming a first rear side pocket that is at a second level deeper │
│    than the air bearing surface, the first side pocket substantially │
│                     polygon shaped                       │
│                          1030                            │
└─────────────────────────────────────────────────────────┘
                              │
                              ▼
┌─────────────────────────────────────────────────────────┐
│ forming a second rear side pocket non-symmetrical with the first │
│   rear side pocket that is at the second level deeper than the air │
│   bearing surface, the second side pockets substantially polygon │
│   shaped wherein the second rear non-symmetrical side pocket │
│      comprises a larger volume than the first rear side pocket │
│                          1040                            │
└─────────────────────────────────────────────────────────┘
```

FIG. 10

SLIDER AIR BEARING FOR DISK DRIVES

BACKGROUND

Typically a disk drive is used to store data. The disk drive can be, among other things, a direct access storage device (DASD) or a hard disk drive (HDD) and can include one or more disks and a disk controller to manage operations on the disks. The disks can be stacked vertically on a spindle by placing the spindle in the center of the disks. The spindle can be turned by a motor at velocities ranging from three to fifteen thousand revolutions per minute. The part of the disk that is nearest the spindle is commonly referred to as the inner diameter (ID) and the part of the disk that is furthest from the spindle is commonly referred to as the outer diameter (OD).

A read write head can be used to write data to and read data from a disk. The read write head is associated with a slider. The slider provides mechanical support for the read write head and electrical connections between the head and the drive. The slider can be attached to a suspension to form a head gimbal assembly (HGA). The HGA can be attached to an actuator arm, which is a part of an actuator assembly, to move and support the HGA. Further the slider includes a pattern of shaped pads on the air bearing surface (ABS) of the slider, which enables the slider to "fly" on an air cushion at a desired height above a disk.

The fly heights of a population of sliders can be plotted as depicted in FIG. 1. The vertical axis represents the frequency and the horizontal one the fly height. The standard deviation σ (also known as "fly height sigma") of the population can be used to measure the fly height spread of a group of parts sharing the same air bearing design. For example, σ1 indicates that the fly heights of this population are more spread apart than another population with σ2.

Manufacturers attempt as much as possible to create sliders that have approximately the same fly heights. The more similar the fly heights for a population of sliders are, the easier it is to manufacture disk drives that operate in a predictable manner and the fewer sliders that the manufacturer will have to dispose of. Therefore, manufacturers of sliders are constantly looking for ways to design sliders that provide as small of a fly height sigma as possible since this will enable them to manufacture disk drives more quickly, that are of superior quality and at a reduced cost.

SUMMARY OF THE INVENTION

Embodiments of the present invention include a slider designed to reduce fly height sigma in a plurality of fly media is provided. In one embodiment, the slider includes an air bearing surface, a front shallow step pad and a rear shallow step pad that are at a first level deeper than the air bearing surface. The slider further includes a first rear side pocket that is at a second level deeper than the air bearing surface, the first side pocket substantially polygon shaped and a second rear non-symmetrical side pocket non-symmetrical with the first rear side pocket that is at the second level deeper than the air bearing surface, the second side pockets substantially polygon shaped wherein the second rear non-symmetrical side pocket comprises a larger volume than the first rear side pocket.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 10 is a flow diagram of an exemplary method for manufacturing a hard disk drive, according to one embodiment.

DETAILED DESCRIPTION

Reference will now be made in detail to the alternative embodiment(s) of the present invention, a slider air bearing for hard disk drives. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Overview

Embodiments of the present invention provide a slider for a hard disk drive that operates at product velocity (between 10,000 and 15,000 RPMs) both helium fly media as well as ambient air fly media. Moreover, the slider of the present invention can operate in a mixture of helium and air. Additionally, the slider of the present invention is suitable to be operated at servo track write speeds of less than 6,000 RPMs in both air and helium fly media. Servo tracks are written in a helium environment to reduce track misregistration errors.

Figure 2:
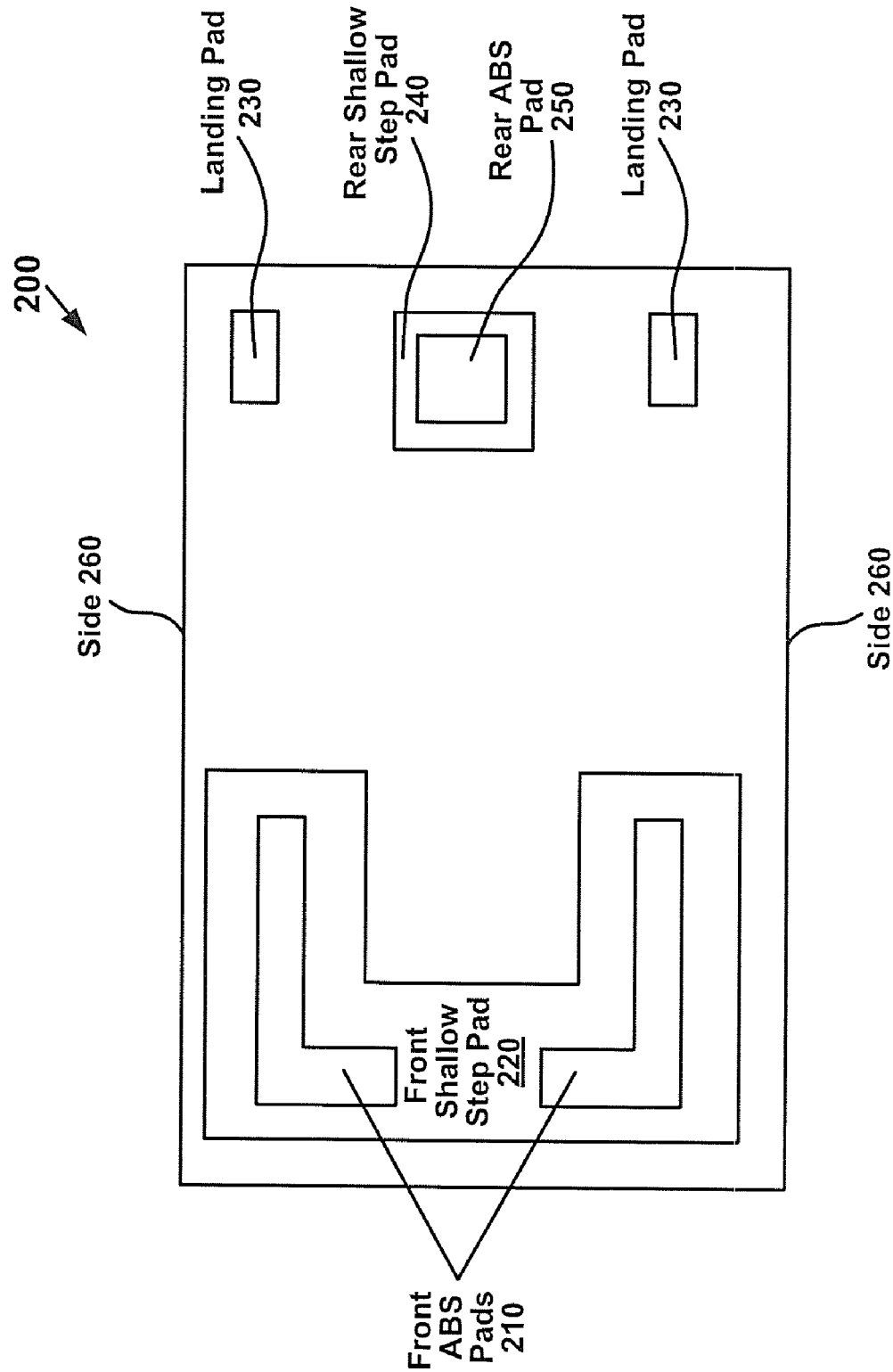
FIG. 2 depicts a conventional slider.

FIG. 2 depicts a conventional slider 200. The conventional slider 200 includes various structures such as front ABS pads 210, a front shallow step pad 220, a rear shallow step pad 240, a rear ABS pad 250, and landing pads 230 located near the rear corners of the slider 200. The structures 210-250 have shapes that are variations of rectangular polygons in nature since the structure 210-250's shapes are based on straight lines and do not include curved profiles. Streamlined structures that adapt to the natural air flow contours can help improve the performance of the air bearing. The geometric nature of the structures 210-250, among other things, associated with conventional sliders 200 limits how streamlined the slider 200's design can be.

Figure 3:
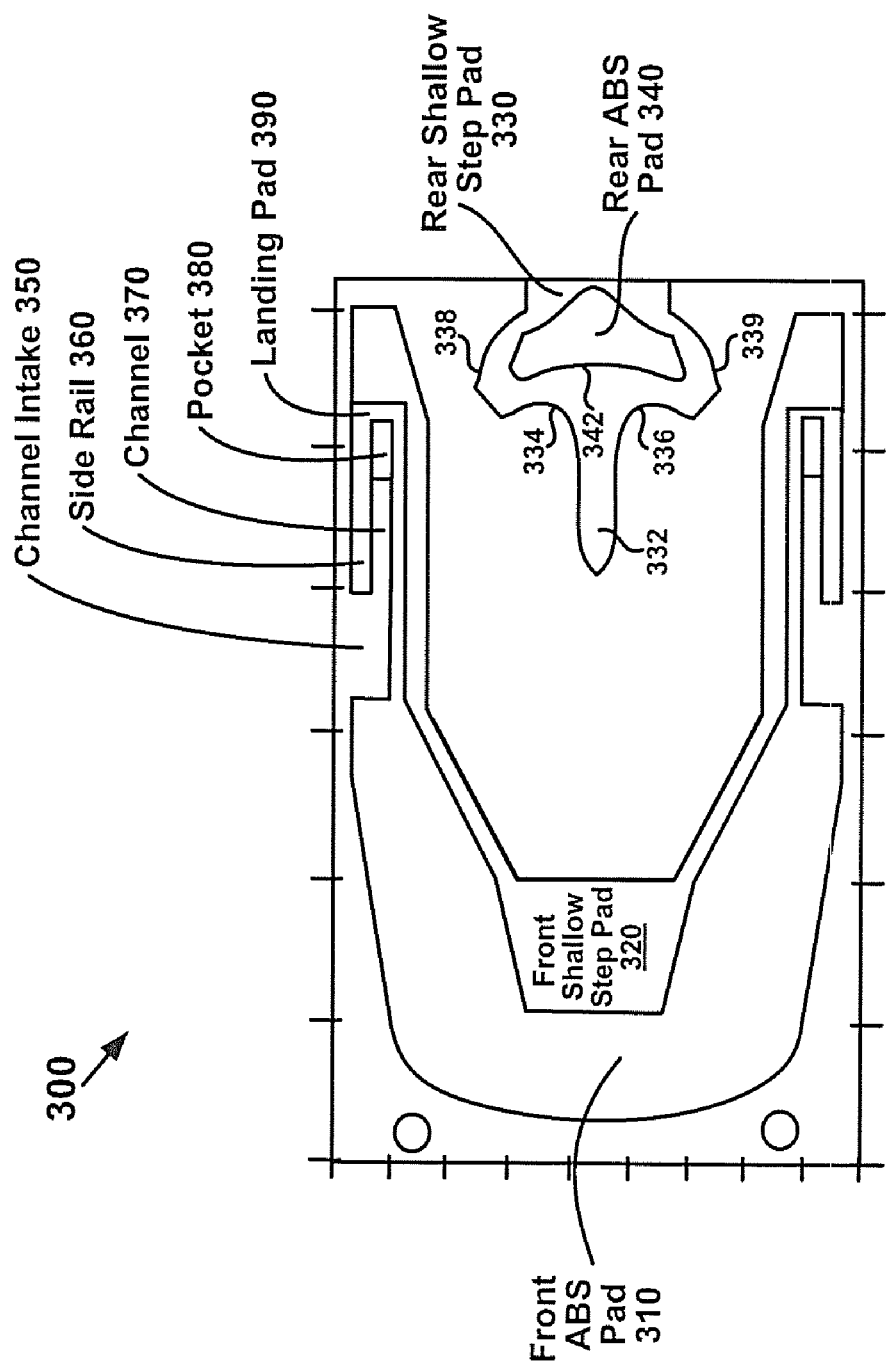
FIG. 3 depicts a slider designed to reduce fly height sigma, according to one embodiment.

In contrast, FIG. 3 depicts a slider 300, according to one embodiment, designed to reduce fly height sigma and improve other performance parameters in both ambient air fly media as well as a helium fly media at both operational speeds and servo track write speeds. The slider 300 includes a front ABS pad 310 that extends continuously to the sides rails 360 and landing pad 390, a shallow step pad 320, a rear shallow step pad 330, a rear ABS pad 340, side rails 360, channels 370, channel intakes 350 and rear side pockets 380.

The rear shallow step pad 330 has several curves associated with it (330) that provide for smooth air flow properties that are not provided by conventional slider designs. The pockets 380 that are located on the sides and toward the rear of the slider 300 are at a second level deeper than the ABS. Among other things, the pockets 380 enable the slider 300 to have consistent operating characteristics in a plurality of fly media and operation speeds. The front ABS pad 310 is shaped to increase the slider pitch stiffness. The rear ABS pad 340 is shaped to reduce the fly height loss effects of air pressure related to various fly media such as a helium and/or air/helium fly media.

Factors that Affect Fly Height Sigma

Fly height variations occur due to inevitable variations in the manufacturing parameters and due to operation speeds as well as fly media. These variations produce unwanted forces that affect the fly height, the pitch and the roll of the slider, thus spreading of the fly height (increasing the fly height sigma) of the sliders across various speeds and fly media. A good way of reducing such fly height spread is by increasing the stiffness of the air bearing or by reducing the sensitivity of the fly height with respect to the manufacturing parameters, so that the fly height deviations from the target value are minimized. Embodiments of the invention provide a slider that has a small fly height spread when used in various fly media as well as various operating speeds or servo track write speeds.

Figure 4:
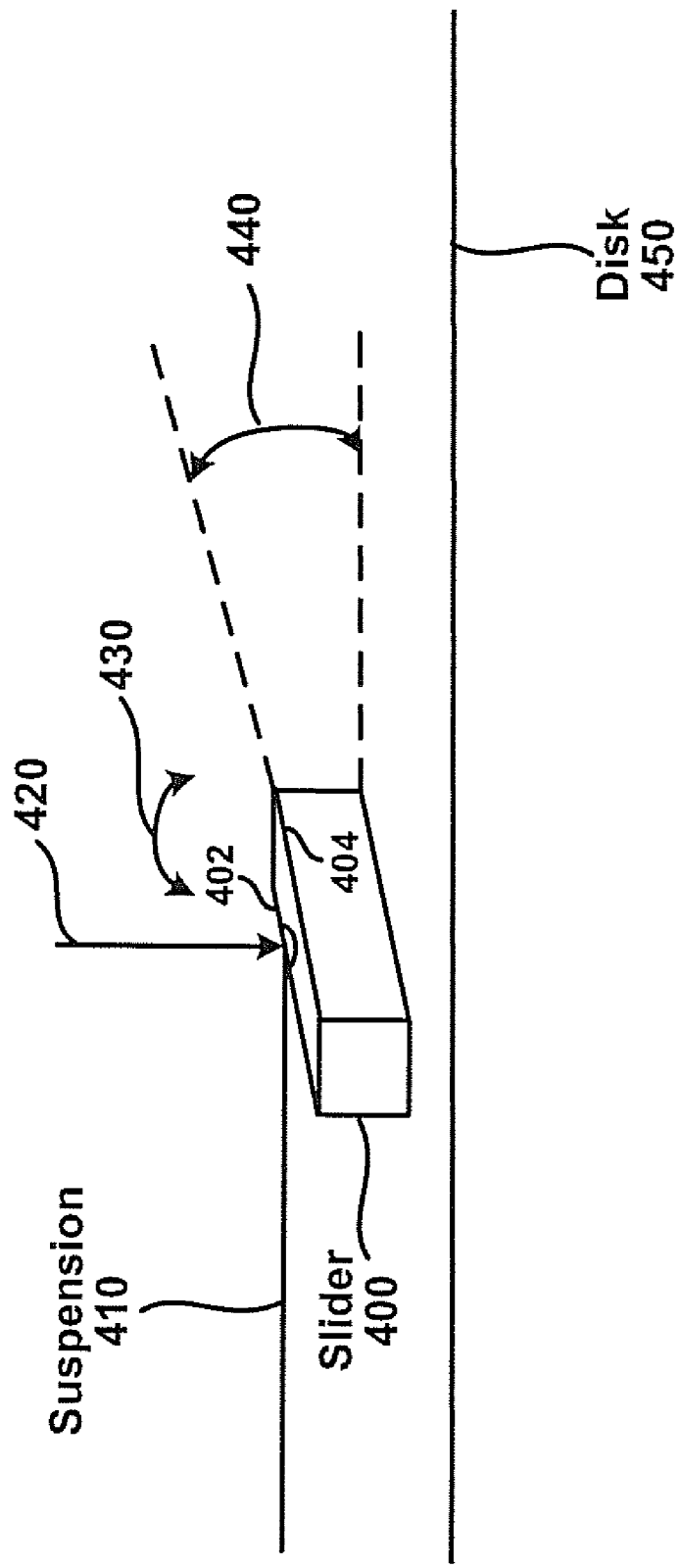
FIG. 4 depicts a slider gliding over the surface of a disk's surface, according to one embodiment.

FIG. 4 depicts a slider 400 as it (400) glides over the surface of a disk 450, according to one embodiment. As the slider 400 glides over the disk 450's surface, air moves between the slider 400 and the disk 450's surface. This air causes the slider 400 to lift upwards. To counter the upward lifting, the suspension 410 applies a force 420 downwards on the slider 400 called preload. Its flexure also applies an upwards pitch moment 440 and a small or zero roll moment 430. Variations in either the preload or pitch or roll moments will affect the fly height attitude. A higher preload force will cause the slider to fly lower. A higher pitch moment will increase the slider pitch and reduce the fly height. A roll moment variation can cause either a fly height gain or loss.

Environmental Factors that Affect Fly Height Sigma

People want to be able to use disk drives in different places on the earth. For example, they may want to use their computer at sea level and they may want to later use the same computer when in the mountains. Air pressure is higher at sea level than at higher altitudes. Air pressure affects how high a slider will fly. A common ambient air pressure effect is that, the lower the air pressure, the lower the slider will fly.

Figure 5:
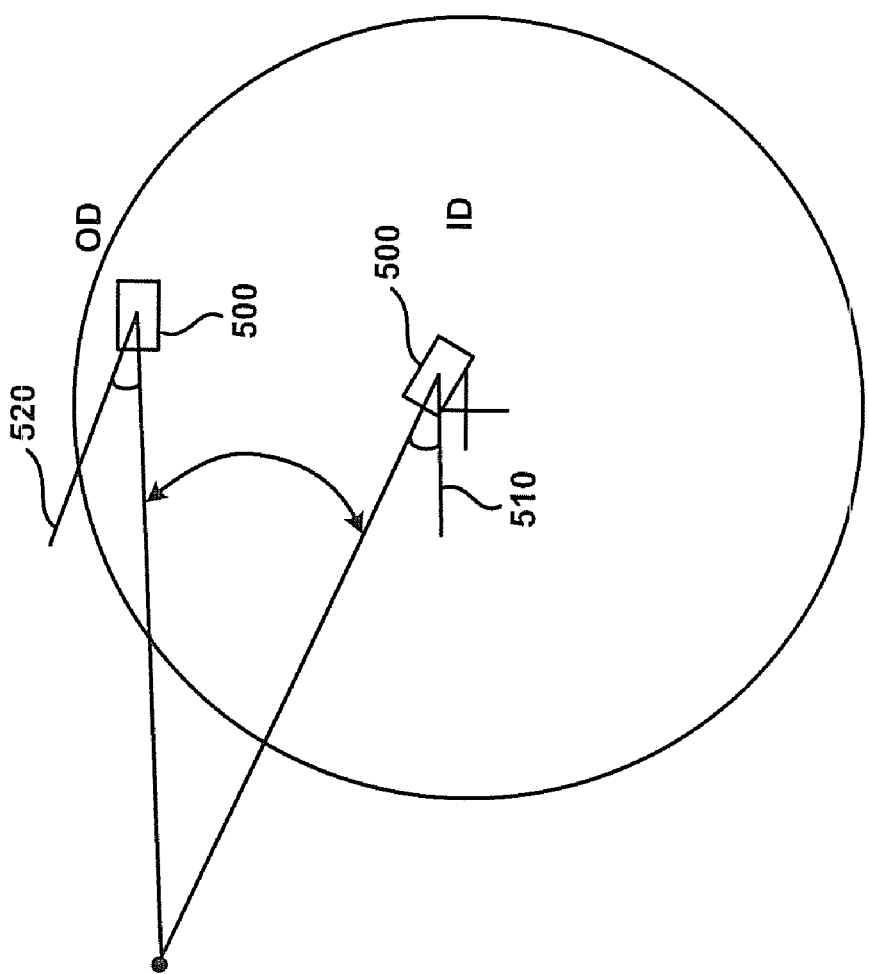
FIG. 5 depicts a slider positioned at the ID and at the OD, according to one embodiment.

The magnitude of the velocity of the disk Linder the slider affects the slider flying attitude. FIG. 5 depicts a slider 500 positioned at the ID and at the OD, according to one embodiment. The velocity of the slider 500 is least at the ID because the radius of the disk is smallest at the ID. The velocity of the slider 500 continually increases as the slider 500 moves toward the OD since the disk's radius increases. Also, a disk drive will operate at higher speeds when performing at product speed (e.g., approximately 15,000 revolutions per minute) than at servo write speed (e.g., approximately 4,000 to 8,000 revolutions per minute). Additionally, the slider of the present invention is suitable to be both operated in and servo tracks written in various fly media.

The direction and velocity of the disk relative to the slider affect the slider fly height. Higher disk velocity tends to increase the pressurization under the slider and increase its fly height. The angle between the disk tangential velocity and the slider length is called skew. Referring to FIG. 5, line 510 represents the direction that air flows toward the slider 500 when it (500) is near the ID and line 520 represents the direction that air flows toward the slider 500 when it (500) is near the OD.

Damping of the Air Bearing

As a component operates, there is a tendency for it to vibrate when excited by any excitation source. Dampening is the ability of the component to counteract this tendency to vibrate. A component has dynamic stability if it has sufficient damping to contain the vibration amplification when operating at its resonance. Various embodiments also provide for dynamic stability which can also result in reduced fly height sigma.

According to one embodiment, the slider 300 has a rectangular shape. For example, the slider 300 may be of the Femto-L type, where the length is approximately 1.25 millimeters and the width is approximately 0.7 millimeters. Rectangular shaped sliders are more prone to rolling than square sliders. However, various embodiments of the present invention can be used to reduce the probability of a rectangular shaped slider, such as a Femto-L, from rolling and therefore reduce fly height sigma.

Front ABS Pad

Figure 6:
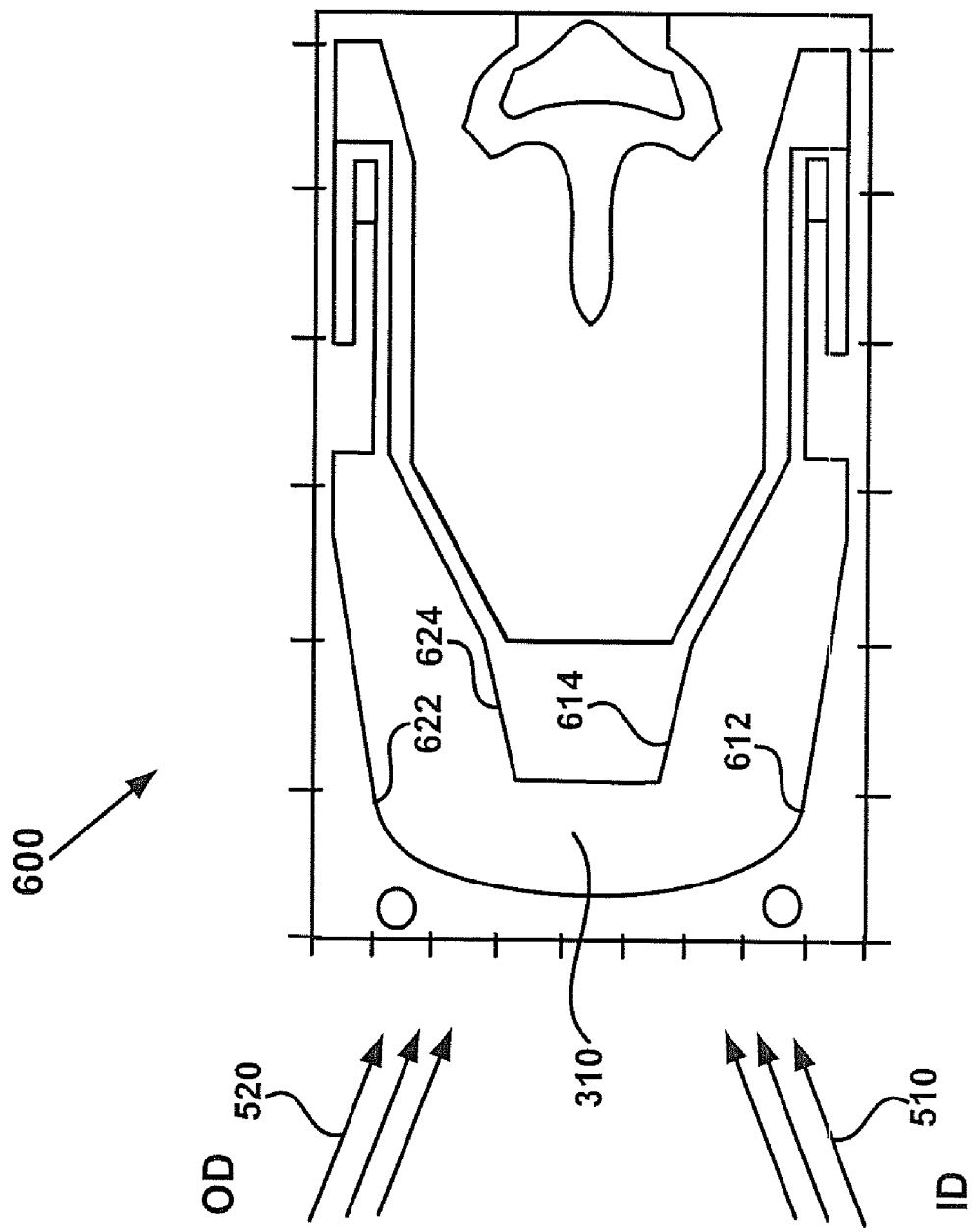
FIG. 6 depicts a slider with respect to air flowing towards the slider approximately from the ID and OD, according to one embodiment.

FIG. 6 depicts a slider 600, according to one embodiment, with respect to air flowing 510, 520 towards the slider 600 approximately from the ID and the OD. Referring to FIGS. 3 and 6, as will become more evident, the front ABS pad 310 has a shape that reduces, among other things, the effects of skew 510, 520. The front abs pad 310 is shaped so that various edges 612, 614, 622, and 624 of it (310) are aligned with the direction 510, 520 air flows toward the slider 600. For example, as depicted in FIG. 6 the inside edge 614 and the outside edge 612 that are toward the slider 600's ID side are aligned approximately with the direction 520 that air flows toward the slider 600's OD side. The inside edge 624 on the slider 600's OD side is aligned approximately with the direction 510 that air flows toward the slider 600's ID side. By extending continuously and without interruption to the side rails 360 and landing pad 390, pad 310 provides protection to the air bearing from ingesting foreign particles that can cause scratches to the air bearing surfaces and disk. Another advantage of this configuration is that features such as cutouts or relieves that separate the various pads are avoided. Usually the edges of these features become places where debris existing on the surface of the disk or disk lubricant is collected during slider operation and can induce fly height change or redeposit again on the disk.

According to one embodiment, the outside edge 622 at the OD side is not aligned with the direction 510 that air flows toward the slider 600's ID side, for example, due to results from simulations of sliders. The simulation results indicated that edge 622 does not need to be aligned with the direction 510 of the air flow from the ID side, according to one embodiment. One possible reason for this is that the air flow from direction 520 tends to be stronger than the air flowing from direction 510.

Rear Shallow Step Pad

Referring to FIG. 3, the rear shallow step pad 330 includes a protrusion 332 (also referred to herein as a "rear shallow step pad protrusion") that is positioned approximately in the center of the front of the rear shallow step pad 330. The rear shallow step pad 330 also includes concavities 334, 336 (also referred to herein as "rear shallow step pad concavities") to each side of the protrusion 332.

The rear shallow step pad 330 has a non-geometric and non-polygon shape, according to one embodiment. For example, the rear shallow step pad 330 can have several curves associated with it (330). The protrusion 332 is curved, the concavities 334, 336 are curved, and the sides 338, 339 of the rear shallow step pad 330 are curved. The protrusion 332 reduces the probability of the slider 300 rolling since, for example, the protrusion 332 can redirect the flow of air. The protrusion 332 contributes to compensating for changes in air pressure and contributes to dynamic stability. The curve of the protrusion 332 toward the slider 300's OD side helps to compensate for the increased strength of air that flows from the OD side. The concavities 334, 336 reduce the effects of air pressure changes on fly height, according to one embodiment. The shape of the rear shallow step pad 330, which includes the protrusion 332, provide for lower sensitivity to changes in air pressure, provide for better dynamic stability through increased damping, and also provide for increased air bearing stiffness and reduced fly height sigma.

Figure 7:
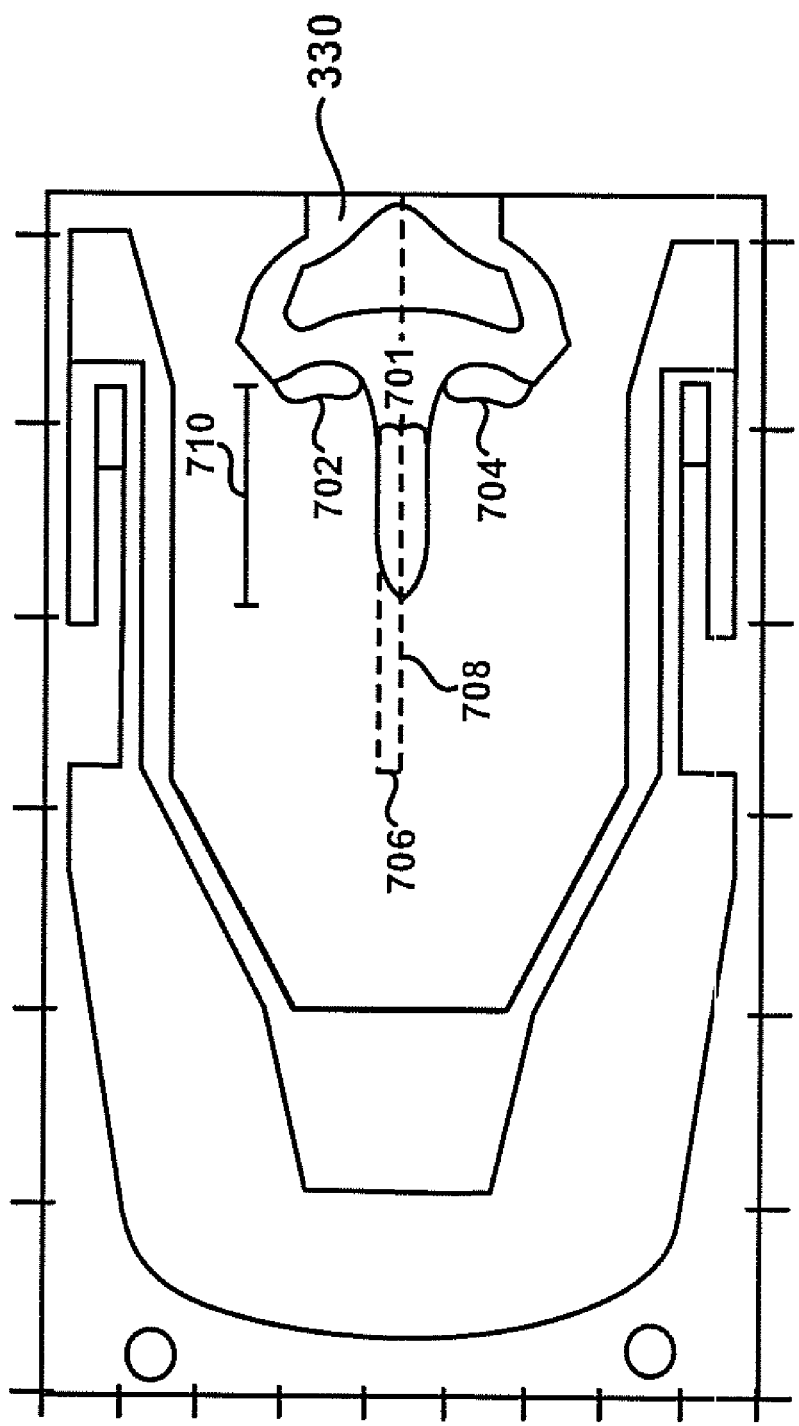
FIG. 7 depicts various dimensions associated with the rear shallow step pad, according to one embodiment.

FIG. 7 depicts various dimensions associated with the rear shallow step pad 330, according to one embodiment. Referring to FIGS. 3 and 7, the length 710 of the protrusion 332 can range from approximately 150-500 microns. According to one embodiment, the protrusion 332's length 710 is approximately 300 microns. The protrusion 332's width 701 can be approximately 100 microns or less. According to one embodiment, the protrusion 332's width 701 is approximately 30 microns. According to one embodiment, the protrusion 332's width 701 is as narrow as the manufacturing process is capable of making it (701).

The rear shallow step pad concavities 334, 336 are approximately 10-100 microns wide 702, 704. According to one embodiment, the rear shallow step pad concavities 334, 336 are approximately 35 microns wide 702, 704. According to one embodiment, the concavity 336 on the ID side is a little deeper than the concavity 334 on the OD side. For example, concavity 336 may be a few microns deeper than concavity 334.

According to one embodiment, the protrusion 332 is curved slightly toward the OD side. For example, the protrusion 332 may be curved 706 approximately 60 microns with respect to an axis 708 along the center of the protrusion 332.

Rear ABS Pad

The front of the rear abs pad is concave, according to one embodiment. The shape of the rear ABS pad helps increase the stiffness of the air bearing, increase damping and reduce the altitude sensitivity.

Figure 8:
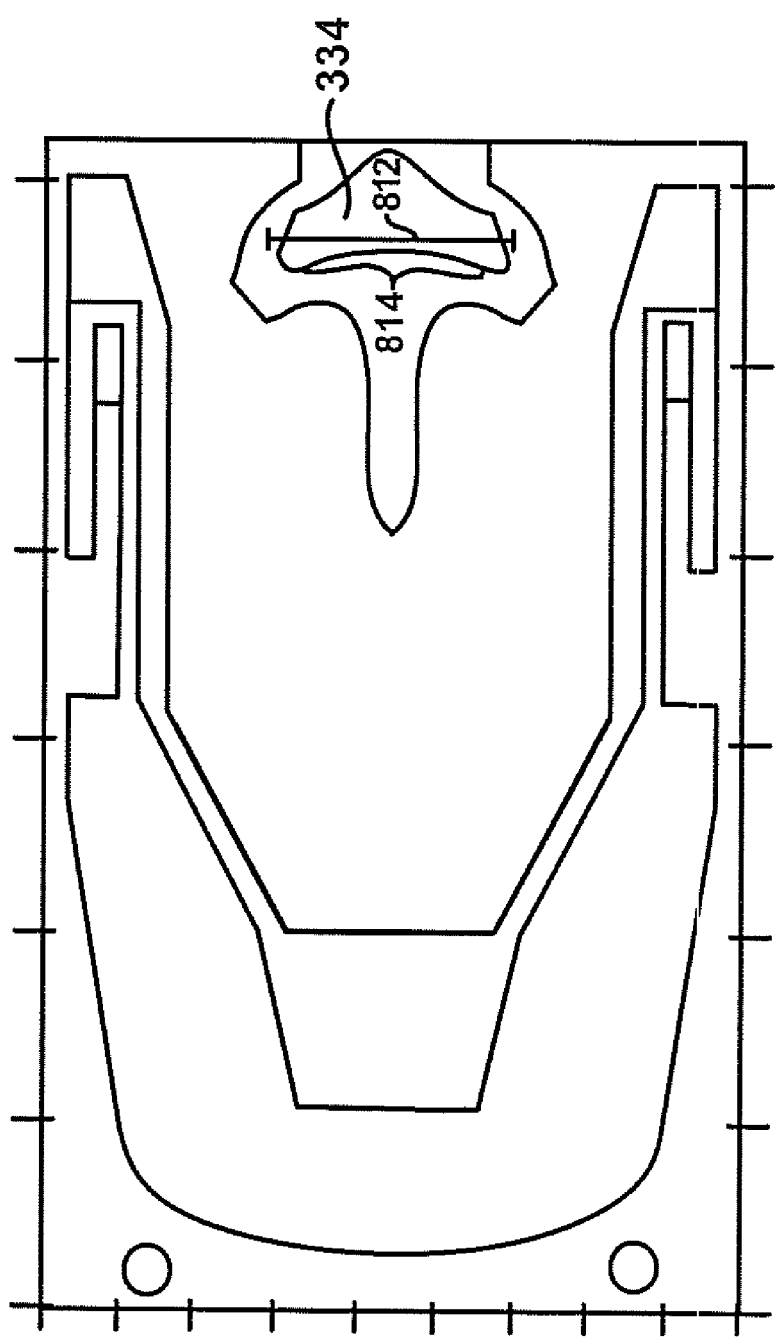
FIG. 8 depicts various dimensions associated with the rear ABS pad, according to one embodiment.

FIG. 8 depicts various dimensions associated with the rear ABS pad 340, according to one embodiment. The length 812 of the rear ABS pad 340 can range from approximately 100-400 microns. According to one embodiment, the length 812 of the rear ABS pad 340 is approximately 250 microns. The length 814 of the concavity 342 in the front of the rear ABS pad 340 ranges from approximately 20-100 microns. According to one embodiment, the length 814 of the concavity 342 is approximately 30 microns.

Rear Side Pockets

According to one embodiment, the side pockets toward the rear of the slider enable the slider to be operated in a plurality of fly media such as helium and air. The slider of the present invention can also be operated at various operation speeds as well as perform well at servo write speeds. The rear side pockets increase the roll stiffness of the air bearing and reduce the probability of the slider rolling, among other things. According to one embodiment, the pockets are in close proximity to landing pads. The pockets 380 are at a second level deeper than the air bearing surface. In one embodiment, the side pockets are polygon shaped. In one embodiment, the side pockets are the only polygon shaped feature of the slider ABS. In one embodiment, the side pockets are non-symmetrical in shape.

Figure 9:
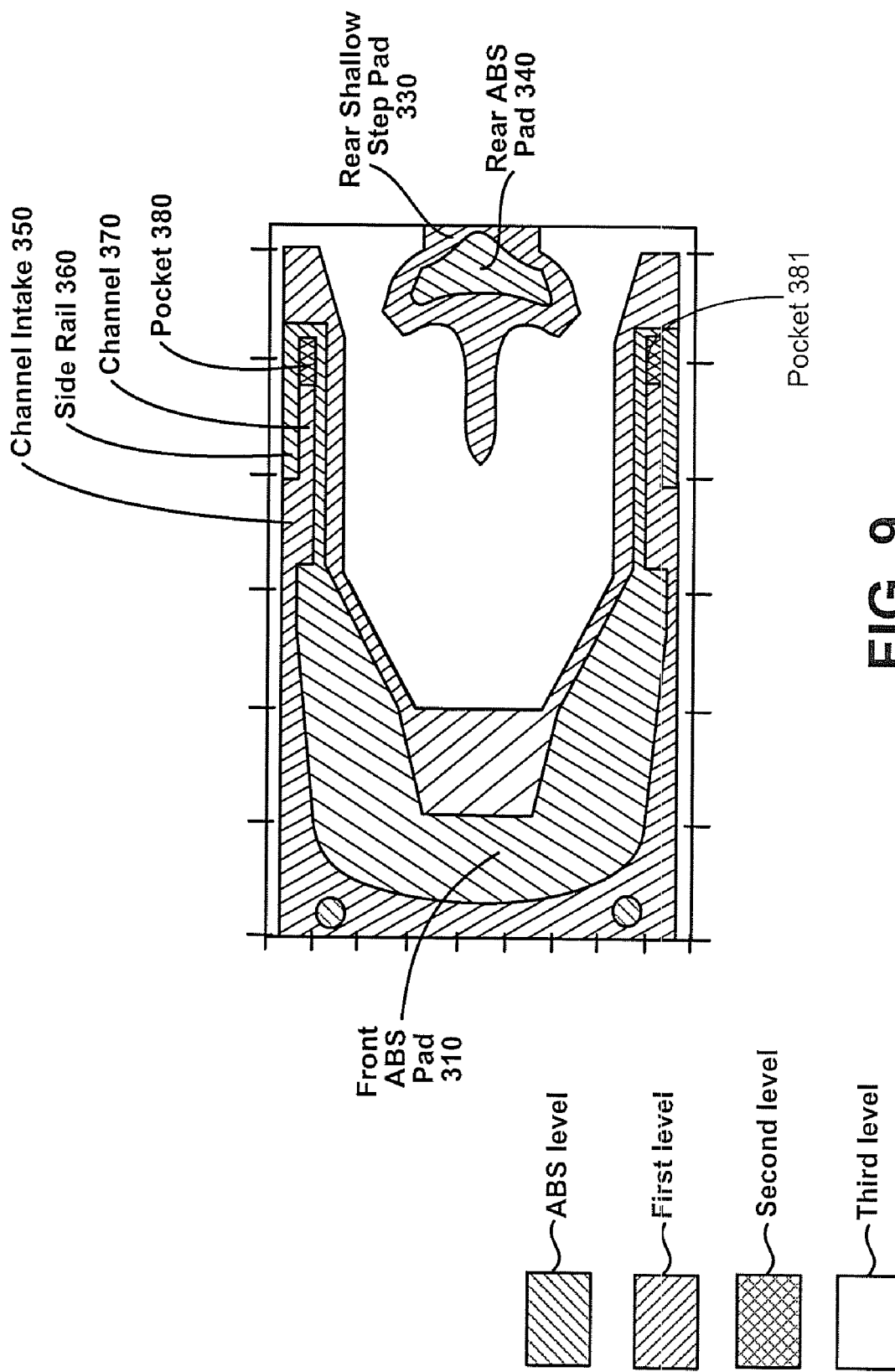
FIG. 9 depicts various etch levels of a slider, according to one embodiment.

FIG. 9 depicts various etch levels of a slider, according to one embodiment. For example, the shallow step pads 320, 330, and the channels 370 are at a first level deeper than the air bearing surface. The pockets 380 and 381 are another level deeper than the front shallow step pad 320, the rear shallow step pad 330, and the channels 370. As air encounters the front of the slider, the pressure of the air increases. The purposes of this illustration, the air pressure at this point shall be referred to as air pressure level A. The air pressure decreases as the air flows into the channel intakes 350 and down the channels 370. The air pressure increases to a level that is higher than air pressure level A when the air encounters the pockets 380 and 381. The build up in the air pressure on both sides of the slider reduces the probability that the slider will roll. Therefore, according to one embodiment, the channels or the pockets, or a combination thereof, help to reduce the probability of the slider rolling. In one embodiment, the pockets 380 and 381 are at the same level, but one has a larger volume than the other.

The sections Front ABS Pad, Rear Shallow Step Pad, Rear ABS Pad, and Pockets discussed various rational for the design of these structures. The discussion of the rational of the slider's design provides a few of the reasons that the design provides reduced fly height sigma. The discussion is not intended to provide all of the reasons for why the design provides for reduced fly height sigma.

Etch Levels of the Slider

Referring to FIG. 9, the first level is approximately 0.05 to 0.40 microns deeper than the ABS, the second level is approximately 1 to 4 microns deeper than the ABS, and the third level is approximately 1.05 to 4.4 microns, the sum of the first two levels, deeper than the ABS. According to one embodiment, the first level is approximately 0.18 microns deeper than the ABS and the second level is approximately 2.0 microns deeper than the ABS. The front ABS pad 310, the rear ABS pad 340, the side rails 360, and the side pads 390 are at ABS level and therefore are nearest to the disk. The front shallow step pad 320, the rear shallow step pad 330, the channel intakes 350, and the channels 370 are one level deeper (the first level) than the ABS level. The pockets 380 and 381 are two levels deeper (the second level) than the ABS. The area depicted with dots is three levels deeper (the third level) than the ABS.

Exemplary Method for Hard Drive Manufacturing

FIG. 10 is a flow diagram of an exemplary method 1000 for manufacturing a hard disk drive in accordance with one embodiment of the invention.

At 1010, method 1000 includes providing an air bearing surface on a disk drive slider.

At 1020, method 1000 includes forming a front shallow step pad and forming a rear shallow step pad that are at a first level deeper than the air bearing surface.

At 1030, method 1000 includes forming a first rear side pocket that is at a second level deeper than the air bearing surface, the first side pocket substantially polygon shaped.

At 1040, method 1000 includes forming a second rear side pocket that is non-symmetrical with the first rear side pocket that is at the second level deeper than the air bearing surface, the second rear side pocket substantially polygon shaped wherein the second rear non-symmetrical side pocket comprises a larger volume than the first rear side pocket.

In one embodiment, the non-symmetrical side pockets enable the slider to have a low sigma when operating in various fly media as well as operation speeds.

Exemplary Disk Drive

Figure 11:
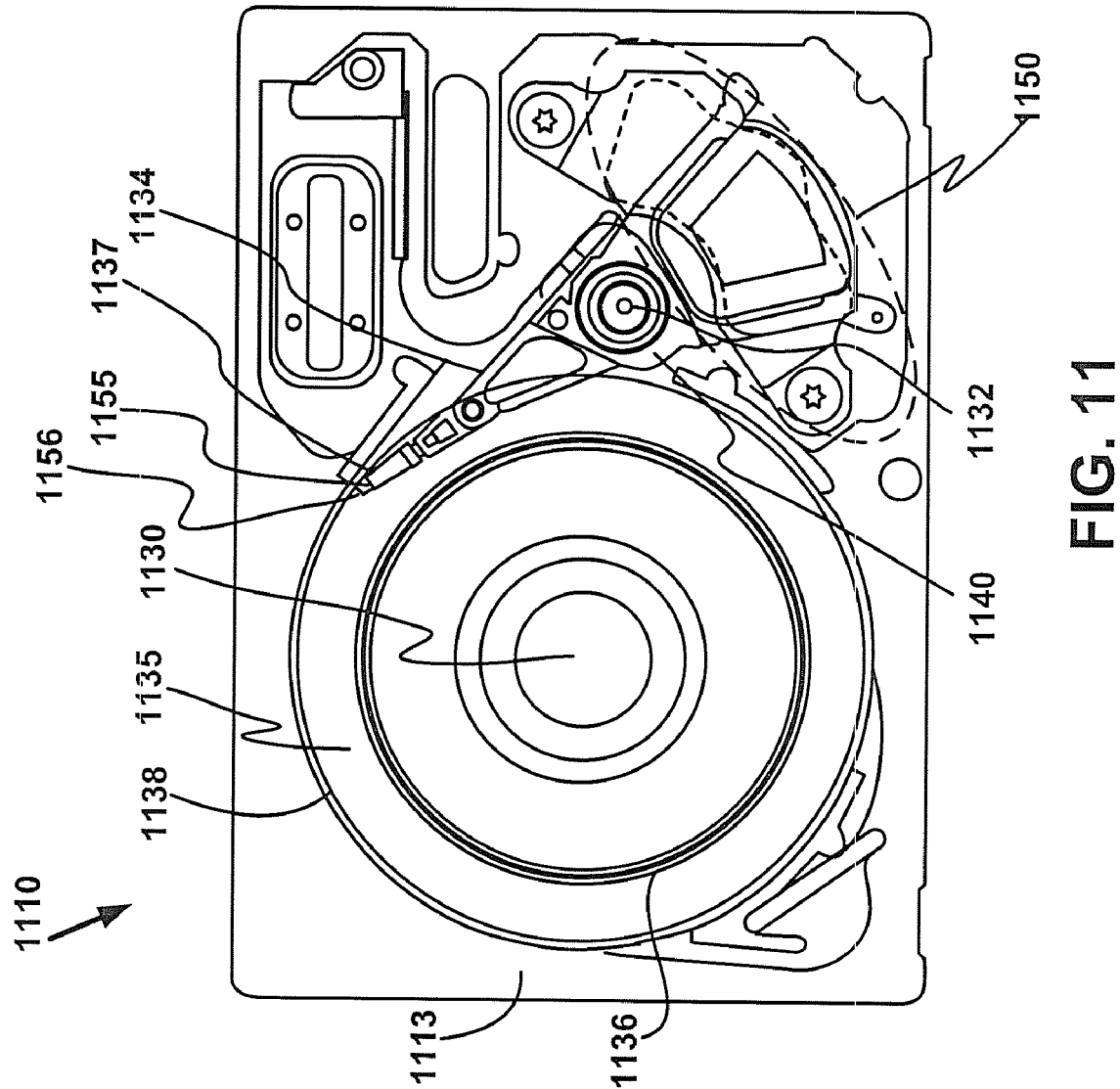
FIG. 11 depicts a plan view of a disk drive for facilitating the discussion of various embodiments of the present invention.

FIG. 11 depicts a plan view of a disk drive for facilitating the discussion of various embodiments of the present invention. The disk drive 1110 includes a base casting 1113, a motor hub assembly 1130, a disk 1138, actuator shaft 1132, actuator arm 1134, suspension assembly 1137, a hub 1140, voice coil motor 1150, a magnetic head 1156, and a slider 1155.

The components are assembled into a base casting 1113, which provides attachment and registration points for components and sub assemblies. A plurality of suspension assemblies 1137 (one shown) can be attached to the actuator arms 1134 (one shown) in the form of a comb. A plurality of transducer heads or sliders 1155 (one shown) can be attached respectively to the suspension assemblies 1137. Sliders 1155 are located proximate to the disk 1138's surface 1135 for reading and writing data with magnetic heads 1156 (one shown). The rotary voice coil motor 1150 rotates actuator arms 1135 about the actuator shaft 1132 in order to move the suspension assemblies 1150 to the desired radial position on a disk 1138. The actuator shaft 1132, hub 1140, actuator arms 1134, and voice coil motor 1150 may be referred to collectively as a rotary actuator assembly.

Data is recorded onto the disk's surface 1135 in a pattern of concentric rings known as data tracks 1136. The disk's surface 1135 is spun at high speed by means of a motor-hub assembly 1130. Data tracks 1136 are recorded onto spinning disk surfaces 1135 by means of magnetic heads 1156, which typically reside at the end of sliders 1155.

Figure 1:
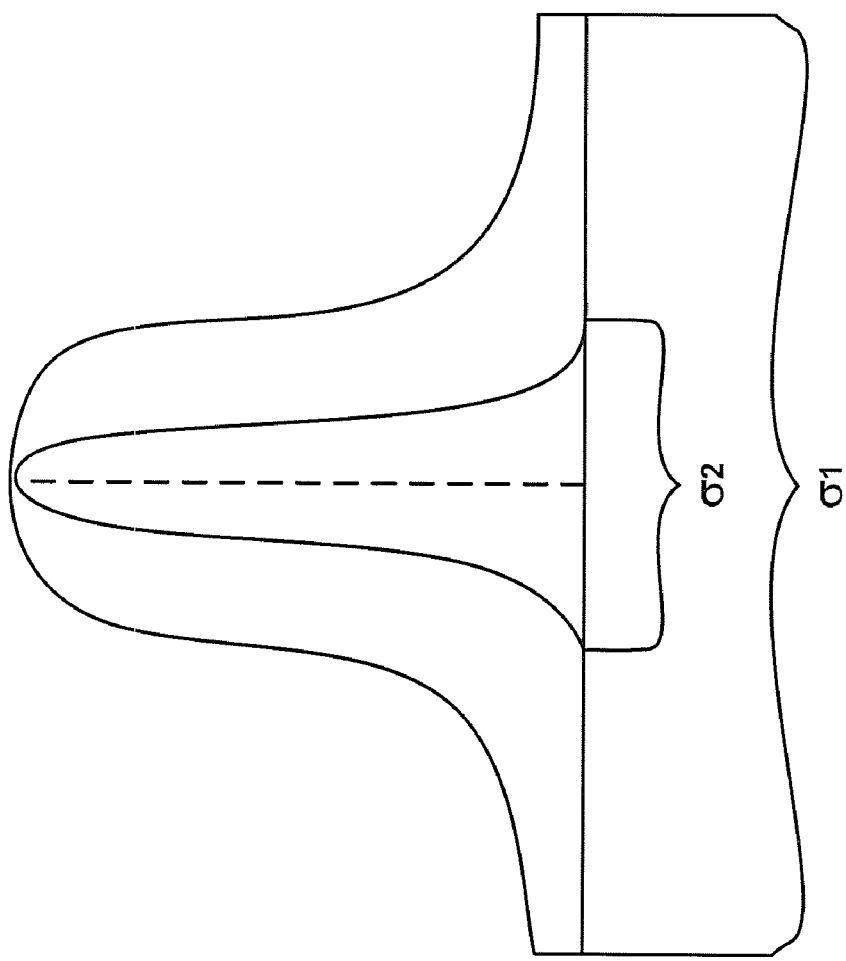
FIG. 1 depicts a distribution of fly heights for a population of sliders.

FIG. 11 being a plan view shows only one head, slider and disk surface combination. One skilled in the art understands that what is described for one head-disk combination applies to multiple head-disk combinations, such as disk stacks (not shown). However, for purposes of brevity and clarity, FIG. 1 only shows one head and one disk surface.

CONCLUSION

Although various embodiments pertain to reducing fly height sigma in a plurality of fly media, various embodiments may be used separately from each other, or in various combinations, to reduce fly height sigma.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A slider designed to reduce fly height sigma in a plurality of fly media, the slider comprising:
   an air bearing surface;
   a front shallow step pad and a rear shallow step pad that are at a first level deeper than the air bearing surface;
   a first rear side pocket that is at a second level deeper than the air bearing surface, said first side pocket substantially polygon shaped; and
   a second rear non-symmetrical side pocket non-symmetrical with said first rear side pocket that is at said second level deeper than the air bearing surface, said second rear non-symmetrical side pockets substantially polygon shaped wherein said second rear non-symmetrical side pocket comprises a larger volume than said first rear side pocket, wherein the first level ranges from approximately 0.05 to 0.40 microns deeper than the air bearing surface and the second level ranges from approximately 1.0 to 4.0 microns deeper than the air bearing surface.

2. The slider of claim 1, wherein the slider further comprises:
   channels in front of the rear side pockets, wherein air flows through the channels then into the first and second rear side pockets.

3. The slider of claim 1 wherein said first rear side pocket is located at an inner radius side of said air bearing surface.

4. The slider of claim 1, wherein the rear side pockets are in close proximity to landing pads that are associated with the slider.

5. The slider of claim 1 wherein said air bearing surface can be used in both helium and ambient air media.

6. The slider of claim 1 wherein said first and second rear side pockets are rectangular shaped.

7. A disk drive that provides reduced fly height sigma, the disk drive comprising:
 a disk; and
 a slider that includes a read write head for writing data to the disk and for reading the data from the disk, wherein the slider includes:
  an air bearing surface;
  a front shallow step pad and a rear shallow step pad that are at a first level deeper than the air bearing surface;
  a first rear side pocket that is at a second level deeper than the air bearing surface, said first side pocket substantially polygon shaped; and
  a second rear non-symmetrical side pocket non-symmetrical with said first rear side pocket that is at said second level deeper than the air bearing surface, said second rear non-symmetrical side pockets substantially polygon shaped wherein said second rear non-symmetrical side pocket comprises a larger volume than said first rear side pocket, wherein the first level ranges from approximately 0.05 to 0.40 microns deeper than the air bearing surface and the second level ranges from approximately 1.0 to 4.0 microns deeper than the air bearing surface.

8. The disk drive of claim 7, wherein the slider further comprises:
 channels in front of the rear side pockets, wherein air flows through the channels then into the first and second rear side pockets.

9. The disk drive of claim 7 wherein said first rear side pocket is located at an inner radius side of said air bearing surface.

10. The disk drive of claim 7, wherein the rear side pockets are in close proximity to landing pads that are associated with the slider.

11. The disk drive of claim 7 wherein said air bearing surface can be used in both helium and ambient air media.

12. The disk drive of claim 7 wherein said first and second rear side pockets are rectangular shaped.

13. A method for manufacturing a disk drive comprising:
 providing an air bearing surface on a disk drive slider;
 forming a front shallow step pad and forming a rear shallow step pad that are at a first level deeper than the air bearing surface;
 forming a first rear side pocket that is at a second level deeper than the air bearing surface, said first side pocket substantially polygon shaped; and
 forming a second rear side pocket non-symmetrical with said first rear side pocket that is at said second level deeper than the air bearing surface, said second rear non-symmetrical side pockets substantially polygon shaped wherein said second rear non-symmetrical side pocket comprises a larger volume than said first rear side pocket;
 providing a helium atmosphere inside said disk drive; and
 writing a servo track on a disk inside said disk drive.

14. The method of claim 13 wherein said servo track is written at a speed between 5,000 and 6,000 revolutions per minute.

15. The method of claim 13 wherein said servo track is written at a speed between 11,000 and 12,000 revolutions per minute.

16. The method of claim 13 further comprising:
 replacing said helium atmosphere inside said disk drive with an ambient air atmosphere; and
 operating said disk drive based on said servo track.

17. The method of claim 13 wherein said first rear side pocket is formed at an inner radius side of said air bearing surface.

* * * * *